US012658188B2

(12) United States Patent (10) Patent No.: US 12,658,188 B2
Iyengar et al. (45) Date of Patent: Jun. 16, 2026

(54) SYSTEM AND METHOD FOR ROBOT INITIATED PERSONALIZED CONVERSATION WITH A USER

(71) Applicant: RN CHIDAKASHI TECHNOLOGIES PRIVATE LIMITED, Mumbai (IN)

(72) Inventors: Prashant Iyengar, Mumbai (IN); Hardik Godara, Jodhpur (IN)

(73) Assignee: RN CHIDAKASHI TECHNOLOGIES PRIVATE LIMITED, Mumbai (IN)

( * ) Notice: Subject to any disclaimer, the term of this patent is extended or adjusted under 35 U.S.C. 154(b) by 237 days.

(21) Appl. No.: 18/283,769

(22) PCT Filed: Mar. 24, 2022

(86) PCT No.: PCT/IN2022/050294
§ 371 (c)(1),
(2) Date: Sep. 22, 2023

(87) PCT Pub. No.: WO2022/201199
PCT Pub. Date: Sep. 29, 2022

(65) Prior Publication Data
US 2024/0169985 A1 May 23, 2024

(30) Foreign Application Priority Data
Mar. 24, 2021 (IN) ............................... 20212102886

(51) Int. Cl.
*G10L 15/22* (2006.01)
*G06Q 30/0601* (2023.01)
(Continued)

(52) U.S. Cl.
CPC .......... *G10L 15/22* (2013.01); *G06Q 30/0631* (2013.01); *G06V 20/41* (2022.01);
(Continued)

(58) Field of Classification Search
CPC ..... G10L 15/22; G10L 15/24; G10L 15/1815; G10L 15/16; G10L 15/063; G06F 40/35;
(Continued)

(56) References Cited

U.S. PATENT DOCUMENTS 10,354,011 B2 * 7/2019 Nell ......................... G06F 3/167
10,399,606 B2 * 9/2019 Frederick ............. B62D 25/161
(Continued)

OTHER PUBLICATIONS

Sirithunge et al., "An Evaluation of Human Conversational Preferences in Social Human-Robot Interaction" (Year: 2021).*
(Continued)

*Primary Examiner* — Richemond Dorvil

(57) ABSTRACT

There is provided a method that includes (i) detecting, using sensor units (111) of a robot (108), at least one of environmental parameters, an environment event, a period of the environment event, an environment alert, a time of an event related to the user (102), personal events related to the user (102), user's relatives or friends or acquaintances, an outdoor environment location, an apparel of the user (102), audio events or visual events, or news, based on surrounding and proclivity of the user (102); and (ii) conversing or interacting with the user (102) based on a conversation topic related to detected environmental parameters, environment event, period of the environment event, environment alert, time of the event related to the user (102), personal events related to the user (102), user's relatives or friends or acquaintances, outdoor environment location, apparel of the user (102), audio events or visual events, or news.

15 Claims, 11 Drawing Sheets

(51) Int. Cl.

| | |
|---|---|
| *G06V 20/40* | (2022.01) |
| *G06V 20/50* | (2022.01) |
| *G10L 15/18* | (2013.01) |
| *G10L 15/24* | (2013.01) |

(52) U.S. Cl.
CPC .............. *G06V 20/44* (2022.01); *G06V 20/50* (2022.01); *G10L 15/1815* (2013.01); *G10L 15/24* (2013.01); *G10L 2015/227* (2013.01); *G10L 2015/228* (2013.01)

(58) Field of Classification Search
CPC ....... G06F 40/30; G06F 40/284; G06N 5/022; G06N 3/08
USPC ......................................................... 704/257
See application file for complete search history.

(56) References Cited

U.S. PATENT DOCUMENTS

| | | | | |
|---|---|---|---|---|
| 10,410,630 | B2 * | 9/2019 | Weng ...................... | G10L 15/02 |
| 10,839,017 | B2 * | 11/2020 | Shinn ................ | G06F 16/90332 |
| 10,898,999 | B1 * | 1/2021 | Cohen .................... | B25J 9/0003 |
| 11,045,271 | B1 * | 6/2021 | Tran ....................... | G16H 20/40 |
| 12,315,301 | B2 * | 5/2025 | Kirmani ................. | G06V 40/23 |
| 2019/0197112 | A1 * | 6/2019 | Kaplan .................. | G06F 40/30 |
| 2025/0170713 | A1 * | 5/2025 | Oh .......................... | B25J 9/1653 |
| 2025/0173606 | A1 * | 5/2025 | Dearing ................. | G06N 20/00 |

OTHER PUBLICATIONS

The effect of blame attribution by a robot in Human-Robot Collaboration (Year: 2021).*

* cited by examiner

ROBOT 108

DETECTING, USING ONE OR MORE SENSOR UNITS, AT LEAST ONE OF ENVIRONMENTAL PARAMETERS TO DETERMINE AN ENVIRONMENT EVENT, A PERIOD OF THE ENVIRONMENT EVENT, AND AN ANOMALY ENVIRONMENT EVENT BY PROCESSING THE DETECTED ENVIRONMENTAL PARAMETERS, AN ENVIRONMENT ALERT, A TIME OF AN EVENT RELATED TO THE USER, PERSONAL EVENTS RELATED TO THE USER, PERSONAL EVENTS RELATED TO USER'S RELATIVES OR FRIENDS OR ACQUAINTANCES, AN OUTDOOR ENVIRONMENT LOCATION, AN APPAREL OF THE USER, AUDIO EVENTS, VISUAL EVENTS, OR NEWS, IN THE SURROUNDING AND PROCLIVITY OF THE USER
902

↓

DETERMINING, BY A ROBOT, A CONVERSATION TOPIC IN A CONVERSATION KNOWLEDGE BASE UTILIZING A CONVERSATIONAL PERSONALIZATION ENGINE RELATED TO DETECTED ENVIRONMENTAL PARAMETERS, THE ENVIRONMENT EVENT, THE PERIOD OF THE ENVIRONMENT EVENT, THE ENVIRONMENT ALERT, THE TIME OF THE EVENT RELATED TO THE USER, THE PERSONAL EVENTS RELATED TO THE USER, THE PERSONAL EVENTS RELATED TO USER'S RELATIVES OR FRIENDS OR ACQUAINTANCES, THE OUTDOOR ENVIRONMENT LOCATION, THE APPAREL OF THE USER, THE AUDIO EVENTS, THE VISUAL EVENTS, OR THE NEWS
904

↓

CONVERSING OR INTERACTING, BY THE ROBOT, WITH THE USER BY CONVERTING THE AT LEAST ONE CONVERSATION TOPIC INTO AT LEAST ONE OUTPUT ACTION AND PERFORMING THE AT LEAST ONE OUTPUT ACTION TO CONVERSE OR INTERACT WITH THE USER
906

↓

IDENTIFYING, BY THE ROBOT, AN ENTITY OR ENTITY CLASS IN A HUMAN ROBOT INTERACTION (HRI) DURING THE PERSONALIZED CONVERSATION BY PROCESSING A CONVERSATION CONTENT DURING PERSONALIZED CONVERSATION THAT IS UTTERED BY THE ROBOT OR THE USER AND IDENTIFYING THE ENTITY OR ENTITY CLASS IN THE CONVERSATION CONTENT, THE ENTITY BEING A PIECE OF WORD IN THE CONVERSATION CONTENT
908

CONVERSING OR INTERACTING, USING AN OUTPUT UNIT OF THE ROBOT, WITH THE USER BY CONVERTING THE AT LEAST ONE CONVERSATION TOPIC RELATED TO THE ENTITY OR ENTITY CLASS INTO AT LEAST ONE OUTPUT ACTION AND PERFORMING THE AT LEAST ONE OUTPUT ACTION TO CONVERSE OR INTERACT WITH THE USER
910

FIG. 9B

SYSTEM AND METHOD FOR ROBOT INITIATED PERSONALIZED CONVERSATION WITH A USER

TECHNICAL FIELD

The embodiments herein generally relate to human-robot interaction; more particularly, a system and a method for a robot-initiated personalized conversation with a user based on surroundings and proclivity of the user.

DESCRIPTION OF THE RELATED ART

There has been tremendous technological advancement in today's world. Humans are continuously engaged in digital gadgets. However, the more advancements are made in the technical field of electronic gadgets, the more difficult it seems to get to engage with the gadgets. The gadgets are made in a way to interact with humans in a command and control manner. The gadgets come to live and perform a certain set of activities only on initially getting a command from a human.

Additionally, the information, suggestions, and any other data put forth by electronic devices are not custom-made based on the preferences of the human. The huge amount of information put forth by a digital device towards a human is extensively irrelevant to the taste of the human. Moreover, the gadgets are not programmed to respond and initiate a conversation with humans.

Therefore, there arises a need to address the aforementioned technical drawbacks in existing technologies and gadgets.

SUMMARY

In view of foregoing embodiments herein provide an improved approach for a robot-initiated personalized conversation with a user based on surroundings and proclivity of the user.

In a first aspect, an embodiment herein provides a processor-implemented method for a robot-initiated personalized conversation with a user based on surrounding and proclivity of the user. The robot initiates a personalized conversation with the user based on the surrounding and proclivity of the user. The robot includes the processor and a memory that stores a conversation knowledge base that comprises one or more conversation topic ontologies, and a set of instructions capable of being executed by the processor. The method includes (i) detecting, using one or more sensor units of a robot, at least one of environmental parameters thereafter to determine an environment event, a period of the environment event and an anomaly environment event by processing the detected environmental parameters, an environment alert, a time of an event related to the user, personal events related to the user, personal events related to user's relatives or friends or acquaintances, an outdoor environment location, an apparel of the user, audio events, visual events, or news, in the surrounding and proclivity of the user, (ii) determining, by a robot, at least one conversation topic in a conversation knowledge base utilizing a conversational personalization engine that is related to detected environmental parameters, the environment event, the period of the environment event, the environment alert, the time of the event related to the user, personal events related to the user, the personal events related to user's relatives or friends or acquaintances, the outdoor environment location, the apparel of the user, the audio events, the visual events, or the news, (iii) conversing or interacting, using an output unit of the robot, converting the at least one conversation topic into at least one output action and performing the at least one output action to converse or interact with the user, (iv) identifying, by the robot, at least one entity or entity class in a human robot interaction (HRI) during the personalized conversation by processing a conversation content during the personalized conversation that is uttered by the robot or the user and identifying the at least one entity or entity class in the conversation content, the at least one entity being a piece of word in the conversation content, and (v) conversing or interacting, using the output unit of the robot, with the user by converting the at least one conversation topic related to the at least one entity or entity class into at least one output action and performing the at least one output action to converse or interact with the user.

In some embodiments, the method comprises (i) identifying, by the robot, at least one of a sibling entity, a sibling entity class, a child entity, a child entity class, a parent entity, or a parent entity class corresponding to the at least one entity that is identified in the personalized conversation using an entity ontology in the conversation knowledge base, (ii) identifying, by the robot, at least one of a super parent entity or a super parent entity class belonging to the parent entity or the parent entity class or a super child entity or a super child entity class belonging to the child entity, or the child entity class, (iii) determining, by the robot, at least one conversation topic, in the conversation knowledge base utilizing the conversational personalization engine, related to the at least one of sibling entity, sibling entity class, child entity, child entity class, parent entity, parent entity class, super parent entity, super parent entity class, super child entity, or super child entity class based on one or more parameters of user interest; and (iv) conversing or interacting, using the output unit of the robot, with the user by converting the at least one conversation topic into at least one output action and performing the at least one output action to converse or interact with the user. The entity ontology is a hierarchy representation of the entities where entities include the sibling entity, the sibling entity class, the child entity, the child entity class, the parent entity, the parent entity class, the super parent entity, the super parent entity class, the super child entity and the super child entity class.

In some embodiments, the method includes initiating the personalized conversation, by the robot based on an environment by (i) detecting, using the one or more sensor units, the environment parameters in the surrounding of the user or a place of interest to the user, (ii) determining the environment event in the surrounding of the user or the place of interest to the user based on the detected environment parameters, (iii) determining a period of the environmental event by matching a pattern of the environmental event with a historical pattern of the environmental event, (iv) determining whether the environment event occurs for a first time or occurs abnormally by performing anomaly event detection on the detected environment parameters, (v) determining a conversation topic related to at least one of the environment parameters, the environment event, the period of the environmental event or a first occurrence or an abnormal occurrence of the environment event, from the conversation knowledge base utilizing the conversational personalization engine, and (vi) conversing or interacting, using the output unit of by the robot, with the user by initiating the personalized conversation based on the determined conversation topic. The robot may use at least one of a weather tracking unit, an environment tracking service, a global positioning system (GPS) unit, an audio sensor, or a visual sensor to detect the environment parameters.

In some embodiments, the method includes initiating the personalized conversation, by the robot based on the environment alert by: (i) determining at least one environment alert related to the surrounding of the user or a place of interest to the user from an environment weather service, (ii) determining a conversation topic related to the at least one environment alert from the conversation knowledge base utilizing the conversational personalization engine; and (iii) conversing or interacting, using the output unit of by the robot, with the user by initiating the personalized conversation with the user based on the determined conversation topic. The environment alert may include at least one of fog, cyclones, storms, tsunami, flood, earthquakes, landslides, volcanic activity, extreme temperatures, drought or wildfires.

In some embodiments, the method includes initiating the personalized conversation, by the robot based on an event and time by: (i) tracking and identifying the user in a day, (ii) detecting at least one of a time of the day, the personal events related to the user on the day or in upcoming days, the personal events related to user's relatives or friends or acquaintances on the day in the upcoming days, or key milestones in the personal events, (iii) determining a conversation topic related to at least one of the time of the day, the personal events related to the user on the day or in the upcoming days, the personal events related to user's relatives or friends or acquaintances on the day or in the upcoming days, or key milestones in the personal events, from the conversation knowledge base utilizing the conversational personalization engine, and (iv) conversing or interacting using the output unit of by the robot, with the user by initiating the personalized conversation with the user based on the determined conversation topic. The robot may use a global positioning system (GPS) unit or an identification unit to track and identify the user. The personal events include at least one of birthdays, wedding, anniversaries, family events, holidays, festivals, scheduled meetings or events or preference of the user.

In some embodiments, the method includes initiating the personalized conversation, by the robot, based on the outdoor environment location by: (i) identifying the outdoor environment location of the user, (ii) detecting at least one of an entity, a parameter, a property or a monument associated with the outdoor environment location, (iii) determining a conversation topic related to at least one of the entity, the parameter, the property or the monument associated with the outdoor environment location, from the conversation knowledge base utilizing the conversational personalization engine, and (iv) conversing or interacting, using the output unit of by the robot, with the user by initiating the personalized conversation with the user based on the determined conversation topic.

In some embodiments, the method includes initiating the personalized conversation, by the robot based on the apparel of the user by: (i) tracking an apparel of the user in a home environment of the user daily, (ii) identifying features and properties of daily apparels of the user based on the tracked apparels, (iii) detecting at least one of a favorite apparel, a favorite color, a favorite apparel type, properties of the favorite apparel, a new apparel, an apparel preference of the user or a pattern of usage of the apparels based on the tracked apparels and the properties of daily apparels, (iv) determining a conversation topic related to at least one of the favorite apparel, the favorite color, the favorite apparel type, the properties of the favorite apparel, the new apparel, the apparel preference of the user, or the pattern of usage of the apparels and (v) conversing or interacting, using the output unit of by the robot, with the user by initiating the personalized conversation with the user based on the determined conversation topic.

In some embodiments, the method includes (i) monitoring shopping habits of the user by accessing purchase and online ecommerce browsing history of the user, and (ii) providing one or more personalized recommendation of apparels based on at least one of features and properties of daily apparels, features and properties of the favorite apparel, the apparel preference or the pattern of usage of the apparels, or shopping habits of the user.

In some embodiments, the method includes (i) tracking at least one of popular personalities, people and handles or links followed by the user, (ii) identifying if the anyone else in a social media network of user or handles followed by the user has worn an apparel that is similar to the apparel of the user or has worn an apparel that includes same type, color, combination as similar to the apparel of the user; and (iii) conversing or interacting, using the output unit of by the robot, with the user by initiating a conversation with the user to provide an information that someone else in the social media network of user or handles followed by the user has worn the apparel that is similar to the apparel of the user or has worn the apparel that includes same type, color, combination as similar to the apparel of the user.

In some embodiments, the method includes initiating the personalized conversation, by the robot, based on the news by: (i) fetching news from a news source of interest of the user, (ii) identifying at least one of key entities or entity class in news headlines or news content of the news, (iii) determining a conversation topic related to at least one of identified key entities or entity class in the news headlines or the news content, and (iv) conversing or interacting, using the output unit of by the robot, with the user by initiating the personalized conversation with the user based on the determined conversation topic.

In some embodiments, the method includes initiating the personalized conversation, by the robot, based on the audio events or the visual events by: (i) classifying at least one audio event or at least one visual event related to the user and (ii) conversing or interacting with the user by initiating an interaction with the user based on the classified at least one audio event or video event.

In some embodiments, the method includes (i) identifying at least one of entity or entity class in at least one of the detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news, (iii) determining a conversation topic related to the identified entity or entity class or other entity or entity instance or other entity class than the identified entity or entity class, from the conversation knowledge base utilizing the conversational personalization engine; and (iv) conversing or interacting, using the output unit of by the robot, with the user by initiating the personalized conversation with the user based on the determined conversation topic.

In some embodiments, the method includes (i) identifying at least one of a sibling entity, a sibling entity class, a child entity, a child entity class, a parent entity, a parent entity class, a super parent entity, a super parent entity class, a super child entity, a super a child entity class, properties of the entity, or properties of the entity class, based on the identified entity or entity class in an entity ontology, (ii) determining a conversation topic, in the conversation knowledge base utilizing the conversational personalization engine, related to the at least one of sibling entity, sibling entity class, child entity, child entity class, parent entity, parent entity class, super parent entity, super parent entity class, super child entity, super child entity class, properties of the entity, or properties of the entity class, based on one or more parameters of user interest and (iii) conversing or interacting using the output unit of by the robot, with the user by initiating the personalized conversation with the user based on the determined conversation topic. The conversation knowledge base includes the entity ontology tree which is a hierarchy representation of entity.

In a second aspect, an embodiment herein provides a system for a robot-initiated personalized conversation with a user, based on surrounding and proclivity of the user. The system includes a robot that initiates a personalized conversation with a user based on the surrounding and proclivity of the user. The robot includes a processor and a memory that stores a conversation knowledge base that includes one or more conversation topic ontologies, and a set of instructions capable of being executed by the processor to (i) detect, using one or more sensor units, at least one of environmental parameters thereafter to determine an environment event, a period of the environment event, and an anomaly environment event by processing the detected environmental parameters, an environment alert, a time of an event related to the user, personal events related to the user, personal events related to user's relatives or friends or acquaintances, an outdoor environment location, an apparel of the user, audio events, visual events, or news, in the surrounding and proclivity of the user, (ii) determine at least one conversation topic in the conversation knowledge base utilizing a conversational personalization engine that is related to detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news, (iii) converse or interact, using an output unit of the robot, converting the at least one conversation topic into at least one output action and performing the at least one output action to converse or interact with the user, (iv) identify at least one entity or entity class in a human robot interaction (HRI) during the personalized conversation by processing a conversation content during personalized conversation that is uttered by the robot or the user and identifying the at least one entity or entity class in the conversation content, the entity being a piece of word in the conversation content, and (v) converse or interact, using the output unit of by the robot, with the user by converting the at least one conversation topic related to the at least one entity or entity class into at least one output action and performing the at least one output action to converse or interact with the user.

In some embodiments, the processor is configured to (i) identify at least one of a sibling entity, a sibling entity class, a child entity, a child entity class, a parent entity, or a parent entity class corresponding to the at least one entity that is identified in the personalized conversation using an entity ontology in the conversation knowledge base, (ii) identify at least one of a super parent entity or a super parent entity class belonging to the parent entity or the parent entity class or a super child entity or a super child entity class belonging to the child entity, or the child entity class, (iii) determine at least one conversation topic, in the conversation knowledge base utilizing the conversational personalization engine, related to the at least one of sibling entity, sibling entity class, child entity, child entity class, parent entity, parent entity class, super parent entity, super parent entity class, super child entity, or super child entity class based on one or more parameters of user interest; and (iv) converse or interact, using the output unit of the robot, with the user by converting the at least one conversation topic into at least one output action and performing the at least one output action to converse or interact with the user. The entity ontology is a hierarchy representation of the entities where entities include the sibling entity, the sibling entity class, the child entity, the child entity class, the parent entity, the parent entity class, the super parent entity, the super parent entity class, the super child entity and the super child entity class.

In some embodiments, the processor is configured to (i) identify at least one of entity or entity class in at least one of the detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news, (ii) determine a conversation topic related to the identified entity or entity class or other entity or entity instance or entity class than the identified entity or entity class, from the conversation knowledge base utilizing the conversational personalization engine, and (iii) converse or interact, using the output unit of by the robot, with the user by initiating the personalized conversation with the user based on the determined conversation topic.

In some embodiments, the processor is configured to (i) identify at least one of sibling entity, sibling entity class, child entity, child entity class, parent entity, parent entity class, super parent entity, super parent entity class, super child entity, super child entity class, properties of the entity, or properties of the entity class, corresponding to the identified entity or entity class in an entity ontology, (ii) determine a conversation topic, in the conversation knowledge base utilizing the conversational personalization engine, related to the at least one of sibling entity, sibling entity class, child entity, child entity class, parent entity, parent entity class, super parent entity, super parent entity class, super child entity, super child entity class, properties of the entity, or properties of the entity class based on one or more parameters of user interest, and (iii) converse or interact, using the output unit of by the robot, with the user by initiating the personalized conversation with the user based on the determined conversation topic. The conversation knowledge base includes the entity ontology which is a hierarchy representation of entities.

The system and/or method is used for initiating a conversation and interacting with user. The system and method may help users across any and all fields to receive suggestions from a robot based on personalized individual preferences and interact with the robot easily and effectively.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 9A and 9B are flow diagrams that illustrate a method for a robot initiated personalized conversation with a user, based on surrounding and proclivity of a user, according to some embodiments herein.

DETAILED DESCRIPTION OF THE DRAWINGS

Figure 1:
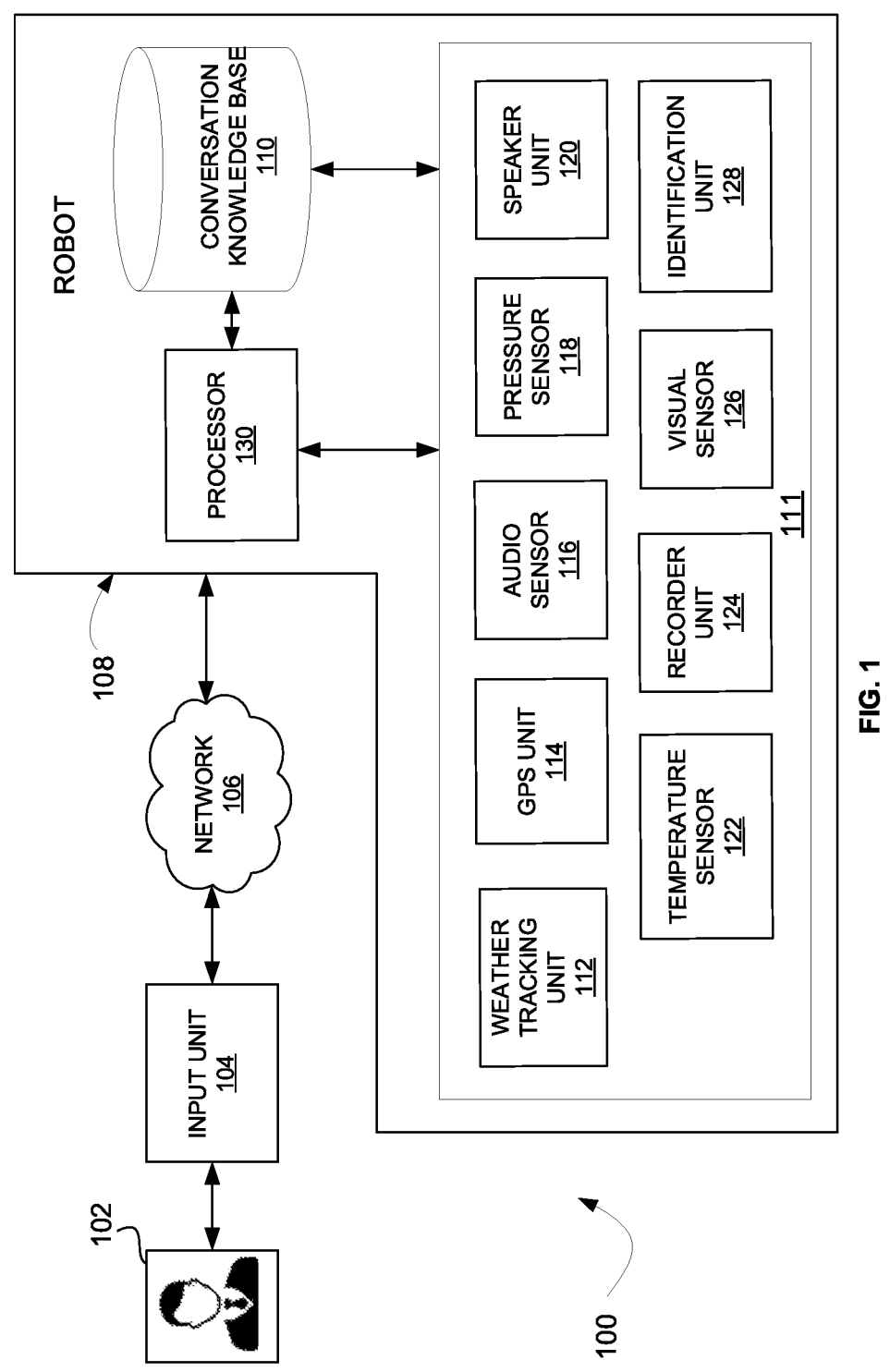
FIG. 1 illustrates a system that enables a robot-initiated personalized conversation with a user, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for mitigating and/or overcoming drawbacks associated with existing systems or gadgets or robots. Referring now to the drawings, and more particularly to FIGS. 1 through 10, where similar reference characters denote corresponding features consistently throughout the figures, preferred embodiments are shown.

As used herein, several terms are defined below:

The term "surrounding of a user" refers to a location or a place or an environment or a predefined area where the user currently present.

The term "proclivity of a user" refers to a tendency or inclination or propensity, or predisposition towards something. For example, user's proclivity for ice cream or user's proclivity to travel to London.

The term "environmental parameters" refers to information regarding state of external environment that may be received from one or more web-based sources and one or more sensors or tracking units. The environmental parameters include, but not limited to, atmospheric condition or weather condition such as temperature, humidity, pressure, and precipitation.

The term "environment event" refers to an event or a group of events that are caused by the environmental parameters. The environment event includes, but not limited to, rainy, sunny, cloudy, windy, high and low tides, sun rise and sun set.

The term "event time" refers to a time of an event that takes place in a day.

The term "outdoor environment location" refers to a location that is away from user's residential location or work location.

The term "outdoor environment event" refers to an event taking place in an open-air location that is away from user's residential location or work location.

The term "personal events" refers to events taking place in the user's surroundings or a user's day to day events.

The term "favorite apparel" refers to an apparel that is worn by the user frequently.

The term "audio events" refers to events that are auditory in nature.

The term "visual events" refers to events that may be captured using an image capturing and recording devices.

The term "features and properties of the apparel" refers to the touch feel and looks of an apparel. The features and properties of the apparel includes, but not limited to, a type of fabric of the apparel, a shape and design of the apparel and a color of the apparel.

The term "entity" refers to a thing with distinct and independent existence. Examples of the entity but not limited to a person, a place, a country, a state or a city.

The term "entity class" refers to a collection of entities sharing the same attributes. The entity is an instance of the entity class.

FIG. 1 illustrates a system 100 that enables a robot 108 initiated personalized conversation with a user 102, according to some embodiments herein. The system 100 includes an input unit 104, and a robot 108 that includes a conversation knowledge base 110, and one or more sensor units 111. The robot 108 initiates the personalized conversation with the user 102 based on surrounding and proclivity of the user 102. The conversation knowledge base 110 that includes one or more conversation topic ontologies. The one or more sensor units 111 includes a weather tracking unit 112, a global positioning system (GPS) unit 114, an audio sensor 116, a pressure sensor 118, a speaker unit 120, a temperature sensor 122, a recorder unit 124, a visual sensor 126 and an identification unit 128. The user 102 is a human interacting with the robot 108. In some embodiments, the robot 108 interacts with the user 102, only when the user 102 initiates a conversation. The input unit 104 may be one of, but not limited to a keyboard, a keypad, a handheld device, a microphone, a remote controller, a console, Bluetooth operated devices or a smart touch screen linked to an electronic device. The input unit 104 may receive an interaction request from the user 102. The interaction request is further communicatively transmitted to the robot 108 via a network 106. The network 106 may be, but not limited to, a wireless network, a wired network, a combination of the wired network and the wireless network or Internet and the like.

The robot 108 includes a processor 130 and a memory that stores a set of user centric information personalized to interact with the user 102 and a set of instructions which is being executed by the processor 130 to perform one or more actions of the robot 108. The robot 108 may be any of, but not limited to, a computer, a laptop, a handheld device, a mobile phone, a kindle, a Personal Digital Assistant (PDA), a music player, an electronic notepad, a smartphone, a tablet or a smart electronic device and the like. In some embodiments, the robot 108 interactively communicate with the user 102 from a web-based system or an application from the robot 108, in accordance with the methods disclosed herein. The conversation knowledge base 110 is communicatively connected with the one or more sensor units 111 and a conversational personalization engine.

The robot 108 detects, using one or more sensor units 111, at least one of environmental parameters thereafter to determine an environment event, a period of the environment event, and an anomaly environment event by processing the detected environmental parameters, an environment alert, a time of an event related to the user 102, personal events related to the user 102, personal events related to user's relatives or friends or acquaintances, an outdoor environment location, an apparel of the user 102, audio events, visual events, or news, in the surrounding and proclivity of the user 102.

The robot 108 determines at least one conversation topic in the conversation knowledge base 110 utilizing a conversational personalization engine that is related to detected environmental parameters, the environment event, the period of the environment event, the environment alert, the time of the event related to the user 102, the personal events related to the user 102, the personal events related to user's relatives or friends or acquaintances, the outdoor environment location, the apparel of the user 102, the audio events, the visual events, or the news and converses or interacts, using an output unit of the robot 108, with the user 102 converting the at least one conversation topic into at least one output action and performing the at least one output action to converse or interact with the user 102. The conversation topic may be in a text format, an audio format, or an audio and video format. In one example, the robot 108 may convert the conversation topic into an audio file to be uttered using a text to speech converter. Then, the robot 108 converses, using a speech synthesizer utilizing the converted audio file, with the user 102.

The robot 108 identifies at least one entity or entity class in a human robot interaction (HRI) during the personalized conversation by processing a conversation content during personalized conversation that is uttered by the robot 108 or the user 102 and identifying the entity or entity class in the conversation content, the entity being a piece of word in the conversation content and converses or interacts, using the output unit, with the user 102 by converting the at least one conversation topic related to the entity or entity class into at least one output action and performing the at least one output action to converse or interact with the user 102.

The output unit may include, but not limited to, a speaker, a monitor, a printer, a graphic plotter, a multimedia screen projector, a headphone, a sound card, a video card, or a speech synthesizer.

The conversation knowledge base 110 stores all the information relevant to the user 102. The data from the conversation knowledge base 110 may be used by the robot 108 to map trends or patterns of user 102 lifestyle and surroundings. Further, the patterns identified may be used in the match and contrast in an event of any anomaly detection.

The weather tracking unit 112, obtains information regarding the weather from various sources, such as the weather department, online weather tools and so on. The weather tracking unit 112, may include at least of a temperature sensor, a pressure sensor, a humidity sensor, a precipitation sensor, an ultrasonic sensor, a visual sensor or an audio sensor. The weather tracking unit 112 tracks and obtains information regarding weather surrounding the user 102 or weather regarding a place of interest to the user 102. The place of interest to the user 102 may include, but not limited to, friends place, relative place or a place where the user 102 willing to travel or a place where the user 102 previously studied or stayed. In an example, the weather tracking unit 112 utilizes the temperature sensor 122 to detect the temperature surrounding the user 102 and, in an event, if the temperature is higher than usual, then the robot 108 initiates a conversation with the user 102 regarding high temperature. The weather tracking unit 112 may measure atmospheric pressure to initiate conversation regarding environmental surrounding the user 102. The pressure sensor 118 may measure the atmospheric pressure to initiate conversation regarding environmental surrounding the user 102.

The GPS unit 114 detects the location of the user 102 to initiate conversation based on the location. In an embodiment, the weather tracking unit 112 may interact communicatively with the GPS unit 114 to obtain weather information confining to an area where the user 102 is based.

The audio sensor 116 gets activated only on the request from the user 102. The audio sensor 116 may be used to detect audio events taking place around the user 102 or in the user's place. The audio sensor 116 may be at least one of a microphone, a peak detector or an amplifier to help the user 102 to interact communicatively with the robot 108. The robot 108 and the user 102 may use the audio sensor 116 to interact with each another. The audio sensor 116 records any conversation, pictures, videos, multimedia events for the robot 108 to interact with the user 102.

The speaker unit 120 may help the user 102 to interact communicatively with the robot 108. In an embodiment, the robot 108 and user 102 may use the speaker unit 120 interactively interact with one another. The recorder unit 124 records any audio-visual data surrounding the user 102. The visual sensor 126 records any visual data surrounding the user 102. The visual sensor 126 may be an imaging device such as a camera placed on a smart device or a videography device. The identification unit 128 identifies the user 102 to personalize the conversation based on the proclivity of the user 102.

Various components of the robot 108 may be remotely located and perform like cohesive unit due to remote interaction capabilities of the robot 108. For example, a part of the robot 108 that is responsible for storing conversation knowledge base 110 may be present on another robot which is remotely accessed by the robot 108. In another example, the one or more sensor units 111 may be present in the surrounding of the user 102.

Figure 2:
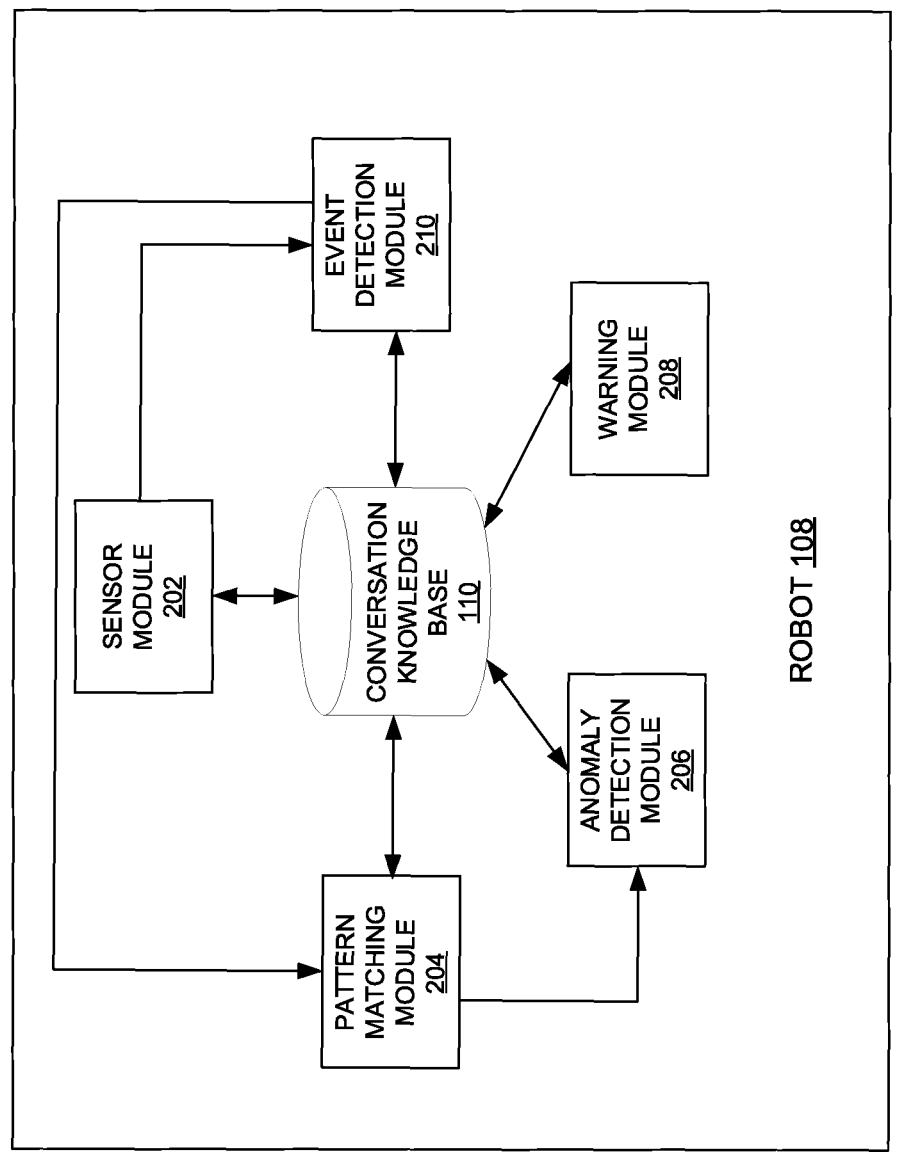
FIG. 2 is a block diagram that illustrates a robot of FIG. 1 for initiating a personalized conversation with the user based on environment, according to some embodiments herein.

FIG. 2 is a block diagram that illustrates the robot 108 of FIG. 1 for initiating a personalized conversation with the user 102 based on environment, according to some embodiments herein. The robot 108 includes the conversation knowledge base 110 that stores conversation topics related to the environment, a sensor module 202, a pattern matching module 204, an anomaly detection module 206, a warning module 208, and an event detection module 210. The robot 108 may use the GPS unit 114 to locate the user 102. Upon locating a specific area of the user 102, the robot 108 uses weather tracking unit 112 to track the weather updates of the surrounding of the user 102.

The sensor module 202 includes, but not limited to, a temperature sensor, a pressure sensor, a visual sensor, an ultrasonic sensor to detect environmental parameters in the surrounding of the user 102 and the location of the user 102. The environmental parameter includes, but not limited to, such as temperature, light condition, humidity, pressure, wind speed, and precipitation. For example, in an event of high temperature, the robot 108 interacts with conversation knowledge base 110 to locate conversation topics related to the high temperature and initiates a conversation with the user 102 relating to high temperature topics. In another example, the robot 108 identifies raining or snowing weather by observing outdoor environment using at least one of the audio sensor 116 or the visual sensor 126 and initiate a conversation with the user 102 based on occurrence of rain or snow. The robot 108 may use the sensor module 202 to sense outdoor temperature and pressure and initiates a conversation with the user 102 based on the outdoor temperature and pressure. For example, the robot 108 says to user 102 "The weather is cool today. Shall we go and sit in balcony to enjoy the weather?"

The event detection module 210 receives the information related to the environmental parameter from the sensor module 202 and identifies environmental events in the user surroundings. The environmental events may include, but not limited to, raining, snowing, fogging, cloudy, windy, high and low tides, sun rise or sun set and so on. For example, the robot 108 detects the high temperature as an environmental parameter, and then, the robot 108 determines the environment event as sunny based on the detected environmental parameter. In an example the event detection module 210 detects occurrence of snow in a user home environment and initiates a conversation with the user 102 regarding snow. In another example, the event detection module 210, detects occurrence of rainfall, and initiates a conversation with the user 102 regarding rainfall. For example, the robot 108 says to user 102 "Today raining nearby to your office. Please keep an umbrella or rain coat with you while going to office?"

The pattern matching module 204 determines a period of the environmental event by matching a pattern of the environmental event with a historical pattern of the environmental event. For example, the pattern matching module 204 receives the information related to the environment event from the event detection module 210, and a period of the environment event by matching a pattern of environmental event with a pattern of previous year environmental event. The pattern matching module 204 notes events occurring on periodic basis. The events occurring on periodic basis may be the seasons of the year, such as summer, winter, rainy, spring, autumn, snow, or high tides and low tides, or sun rise and sun set. For example, the robot 108 says to user 102 "Hurray! Today first time raining in rainy season for this year."

The anomaly detection module 206 performs anomaly event detection on the environment parameters to determine whether the environment events occurred for a first time or occurs abnormally. The anomaly detection may detect environment parameters such as first instance of rain, snow, hail, spring, fog, or an occurrence of storms, cyclones or tsunami. The conversation knowledge base 110 stores and locates the information when required to initiate a conversation based on environment. For example, during a first instance of rains, the robot 108 may initiate a conversation based on rainy season. The anomaly detection module 206 detects an anomaly in the event of more than average rainfall occurrence in a stipulated amount of time and the robot 108 initiates a conversation on high rainfall. For example, the robot 108 says to user 102 "Heavy Rain this month. It may lead to flood as like 2016 flood. I am worried about the flood."

The robot 108 detects that rainy season has ended by identifying that no more rainfall occurrence for a significant duration of time and initiates conversation with the user on ending of rainy season. The warning module 208 issues alerts from the weather tracking unit 112 regarding fog, cyclones, storms, tsunami, and the robot 108 initiates conversation with user 102 regarding the environmental alert. The environmental alert may include alert about fog, cyclones, storms, tsunami, flood, earthquakes, landslides, volcanic activity, extreme temperatures, drought or wildfires. The identified environmental events may be used as conversational topics ontology related between the robot 108 and the user 102. For example, the robot 108 says to user 102 "Hurry up. I have seen a flash news just now regarding earthquake. Let's prepare ourself to face the earthquake."

In some embodiments, the robot 108 detects at least one of environment parameters, environment events, the period of the environmental event, anomaly environment event, or the environment alert that belongs to a location interest of the user 102, and initiates conversation with the user 102 related to the detected environment parameters, events, alerts, period, anomaly event that belongs to the location interest of the user 102. The location interest of the user 102 may be any place, state, or country. For example, the robot 108 says to user 102 "Heavy Rain this month in your friend's place. It may lead to flood as like 2016 flood. I am worried about the flood."

Figure 3:
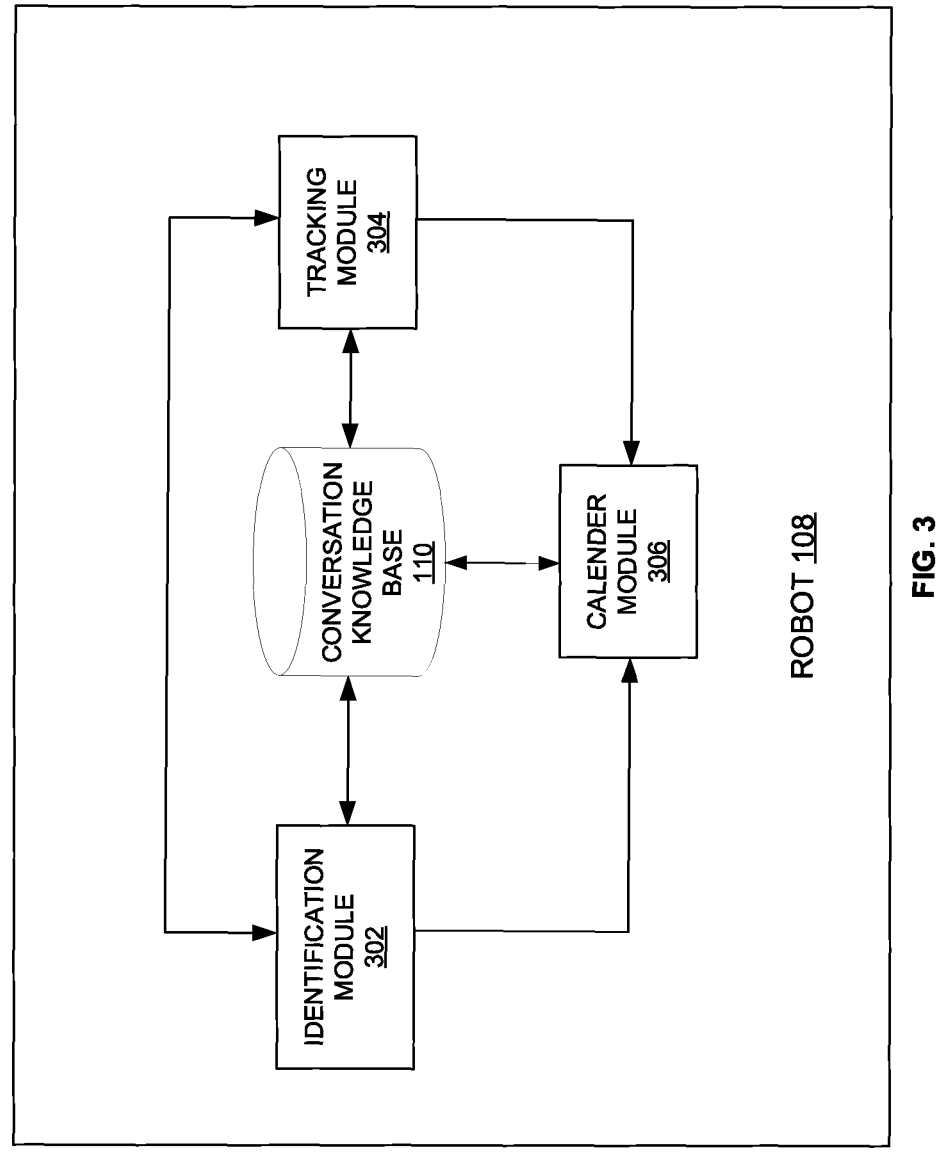
FIG. 3 is a block diagram that illustrates a robot of FIG. 1 for initiating a personalized conversation with the user based on an event and an even time related to the user, according to some embodiments herein.

FIG. 3 is a block diagram that illustrates the robot 108 of FIG. 1 for initiating a personalized conversation with the user 102 based on an event and event time related to the user 102, according to some embodiments herein. The robot 108 includes the conversation knowledge base 110 includes conversation topics related to events and event time, an identification module 302, a tracking module 304 and a calendar module 306. The identification module 302 may use identification tools to verify the authenticity of the user 102. In an embodiment, the identification tool may consist of face recognition software, pin code software, finger print detection and so on.

The identification module 302 may include an imaging unit, or a hearing unit such as microphone. The tracking module 304 may use at least one of the GPS unit 114, WIFI access points, Bluetooth access points, or any indoor tracking unit to track and identify a location of the user 102. The robot 108 identifies a time of the day while the robot 108 is locating the user 102 during the day. For example, if the robot 108 locates the user 102 for a first time during the day, the robot 108 initiates a conversation by greeting the user 102 based on the time of the day. For example, based on the user 102 surrounding time of the day the robot 108 may wish good morning or good afternoon and so on. For example, the robot 108 says to user 102 "Good morning" if the robot 108 meets the user 102 first time for the day in morning. The robot 108 updates information in the conversation knowledge base 110 based on the input received from the calendar module 306.

The calendar module 306 detects at least one of, the personal events related to the user 102 on the day or in the upcoming days, or the personal events related to user's relatives or friends or acquaintances on the day or in the upcoming days. The personal events may include, but not limited to, birthdays, wedding, anniversaries, family events, holidays, festivals, scheduled meetings or events, public holidays, bank holidays, or preference of the user 102. The calendar module 306 identifies and stores user 102 information regarding an age, a date of birth, anniversaries and so on. In an example the robot 108 may wish or greet the user 102 with birthday wishes and initiate a conversation regarding user's 102 birthday, if the calendar module 306 identifies that today is the birthday of the user 102. For example, the robot 108 says to user 102 "Many more returns of the day" "Last year, we have celebrated your birthday in Taj hotel. But we did not celebrate your birthday this year due to pandemic situation". However, you denoted some amount to charities which is a wonderful activity." The calendar module 306 also identifies key milestone birthdays such as 16 years, 18 years, 25 years and so on. Additionally, the calendar module 306 also identifies and stores information regarding user's 102 relatives, friends and acquaintances. The robot 108 may locate the information and send a reminder to the user 102 regarding the events stored in the calendar module 306. In an example, the robot 108 locates and detects the user 102 on or prior to date of the personal events and initiates a conversation with the user to remind the user 102 about the personal events. The robot 108 may locate the user's personal information regarding any events and send a reminder to the user 102 regarding the events stored in the calendar module 306. In an example, the robot 108 may locate information regarding friend's age and date of birth and remind the user 102 to send birthday wishes to the friend. In an embodiment, the calendar module 306 stores information regarding dates of festivals, public holidays, bank holidays, anniversaries of preference of the user 102 and the robot 108 may initiate a conversation regarding the same. For example, the robot 108 says to user 102 "Hurray, today is public holiday. So, I can spend more time with you."

Figure 4:
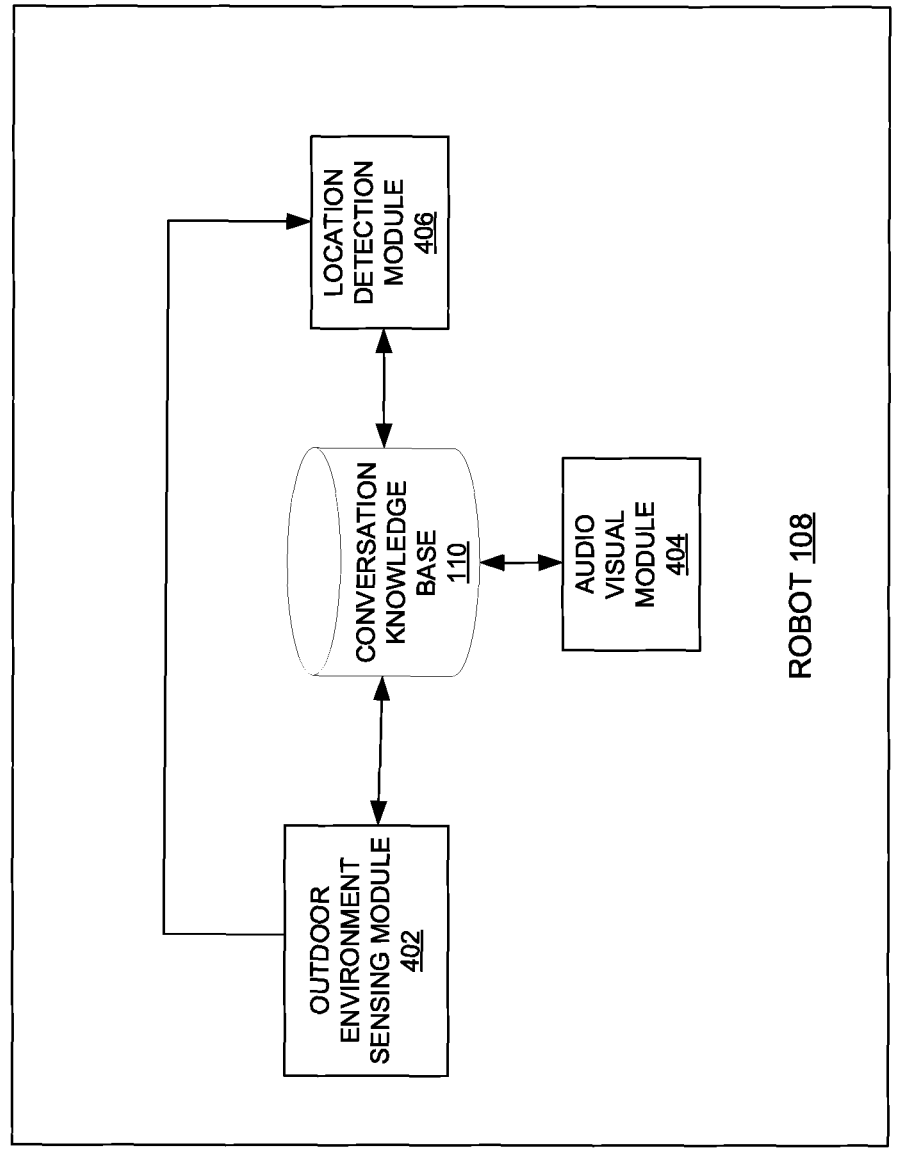
FIG. 4 is a block diagram that illustrates a robot of FIG. 1 for initiating a personalized conversation with the user based on outdoor environment location, according to some embodiments herein.

FIG. 4 is a block diagram that illustrates the robot 108 of FIG. 1 for initiating a personalized conversation with the user 102 based on outdoor environment location, according to some embodiments herein. The robot 108 includes the conversation knowledge base 110 that stores conversation topics related to the on outdoor environment, an outdoor environment sensing module 402, an audio-visual module 404 and a location detection module 406. The outdoor environment sensing module 402 is activated only on the identification of an outdoor location surrounding the user 102. In an embodiment, the outdoor environment sensing module 402 detects an outdoor environment location if the user 102 and robot 108 are inside an automobile, inside a mass transportation vehicle, public location such as a museum, restaurant, amusement parks, religious places and so on, open spaces such as beaches, forests, hiking trails and so on. The location detection module 406 may use a GPS to locate the geographical location of the user 102. The robot 108 identifies the exact outdoor location of the user 102 by extracting relevant information from conversation knowledge base 110 based on the outdoor environment location. The robot 108 uses a machine learning algorithm to identify and classify the outdoor environment location. The robot 108 may initiate, using a conversation module 506, a conversation related to the identified outdoor environment location. The audio-visual module 404 records any conversation, pictures, videos, multimedia events in the outdoor environment location for the robot 108 to interact with the user 102. The outdoor environment sensing module 402 detects at least one of an entity, a parameter, a property or a monument associated with the outdoor environment location. In an example, the robot 108 identifies the user 102 location near Statue of Liberty and initiates a conversation on the Statue of Liberty using the information gathered from conversation knowledge base 110. For example, the robot 108 says to the user 102 "do you know Statue of Liberty was a gift of the French people to the Americans on the commemoration of American Independence on Jul. 4, 1776?"

Figure 5:
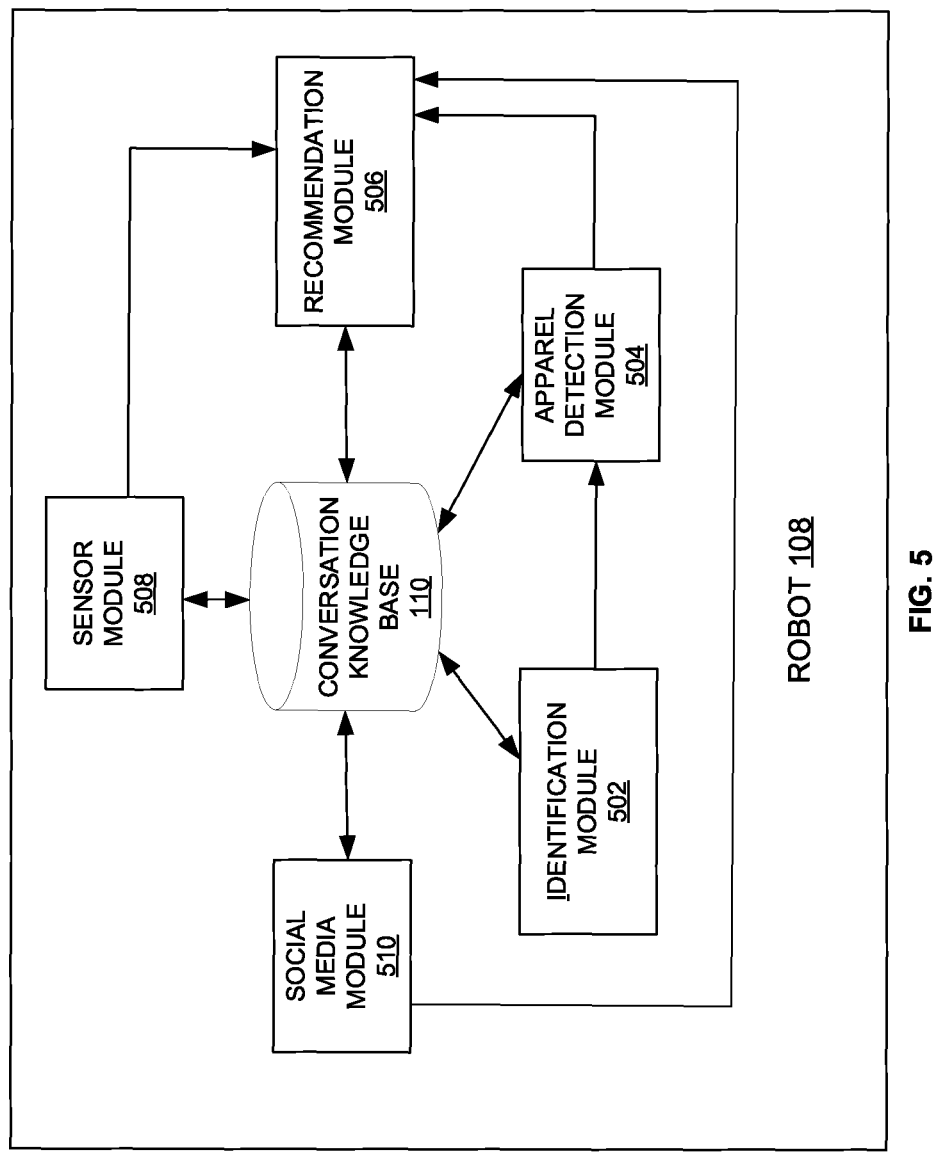
FIG. 5 is a block diagram that illustrates a robot of FIG. 1 for initiating a personalized conversation with the user based on user apparel, according to some embodiments herein.

FIG. 5 is a block diagram that illustrates the robot 108 of FIG. 1 for initiating a personalized conversation with the user 102 based on user apparel, according to some embodiments herein. The robot 108 includes the conversation knowledge base 110 that stores conversation topics related to apparels, an identification module 502, an apparel detection module 504, a recommendation module 506, sensor module 508, and a social media module 510. The robot 108 performs user detection and identification using the identification module 502. The user 102 is associated to a specific range of apparel features. The apparel detection module 504 (*i*) tracks an apparel of the user 102 in a home environment of the user 102 daily, (ii) identifies features and properties of daily apparels of the user 102 based on the tracked apparels, and (iii) detects at least one of a favorite apparel, a favorite color, a favorite apparel type, properties of the favorite apparel, a new apparel, an apparel preference of the user 102 or a pattern of usage of the apparels based on the tracked apparels and the properties of daily apparels. The robot 108 determines a conversation topic related to at least one of the favorite apparel, the favorite color, the favorite apparel type, the properties of the favorite apparel, the new apparel, the apparel preference of the user 102, or the pattern of usage of the apparels, and initiates, using the personalized conversation with the user 102 based on the determined conversation topic. For example, the robot 108 says to the user 102 "you are looking beautiful in this outfit." For example, the robot 108 says to the user 102 "you are wearing your favorite dress." The recommendation module 506 suggests the user 102 apparel type based on the information previously stored. For example, the robot 108 says "I have seen few new arrivals in online shopping market. I feel that new arrivals will suits to you." However, the robot 108 may not limit the suggestions based on the information history. The sensor module 508 identifies a new apparel worn by the user 102 and the robot 108 may initiate a conversation with the user 102 regarding the new apparel. The sensor module 508 may also identify an apparel being worn by the user 102 after a long time and the robot 108 initiates a conversation with the user 102 regarding the apparel that is worn after long time. For example, the robot 108 says to the user 102 "you are wearing this after long time. You have worn this dress last year for your sister's birthday."

The social media module 510 detects and stores shopping habits of the user 102 and the robot 108 may initiate a conversation with the user 102 regarding shopping of apparels. The social media module 510 monitors shopping habits of the user 102 by accessing purchase and online ecommerce browsing history of the user 102. For example, the social media module 510 extracts a type of apparel purchased, an amount spent for purchasing, or no. of apparel purchased. The robot 108 may initiate a conversation with the user 102 regarding shopping of apparels. The social media module 510 may provide relevant information to the robot 108 with personalized information regarding the user purchase and browsing e-commerce history of the user 102. The robot 108 may be equipped with personalized information regarding the user 102 purchase and browsing e-commerce history of the user 102. The robot 108 may also provide personalized recommendations, suggestions for new apparel types, colors of apparel based on apparel preference of the user 102. The robot 108 may be equipped to showcase tracks of popular personalities, people and social media handles or links followed by the user.

The robot 108 may associate features and properties of the favorite apparel and daily apparel of the user 102 and shopping habits to one or more apparel recommendations for e-commerce purposes as personalized suggestions to the user 102.

The recommendation module 506 provides one or more personalized recommendations of apparels based on at least one of features and properties of daily apparels, features and properties of the favorite apparel, the apparel preference or the pattern of usage of the apparels, or shopping habits. The robot 108 may initiate a conversation with the user 102 based on the one or more apparel recommendations. The recommendation module 506 suggests the user 102 an apparel type based on the information previously stored. However, the robot 108 may not limit the suggestions based on the information history. The recommendation module 506 may also provide personalized recommendations, suggestions for new apparel types, colors of apparel based on the apparel preference of the user 102.

The social media module 510 (i) tracks at least one of popular personalities, people and handles or links followed by the user 102, (ii) identifies if anyone else in a social media network of the user 102 or handles followed by the user 102 has worn apparel that is similar to the apparel of the user 102 or has worn apparel that includes same type, color, combination as similar to the apparel of the user 102, and (iii) initiates a conversation with the user 102 to provide information that someone else in the social media network of the user 102 or handles followed by the user 102 has worn the apparel that is similar to the apparel of the user 102 or has worn the apparel that includes same type, color, combination as similar to the apparel of the user 102. The robot 108 may include information to showcase to the user 102 some tracks of popular personalities, people and social media handles or links followed by the user. For example, the robot 108 says to the user 102 "your favorite actor too wears a dress that is similar to the dress with you. That is so cool!"

Figure 6:
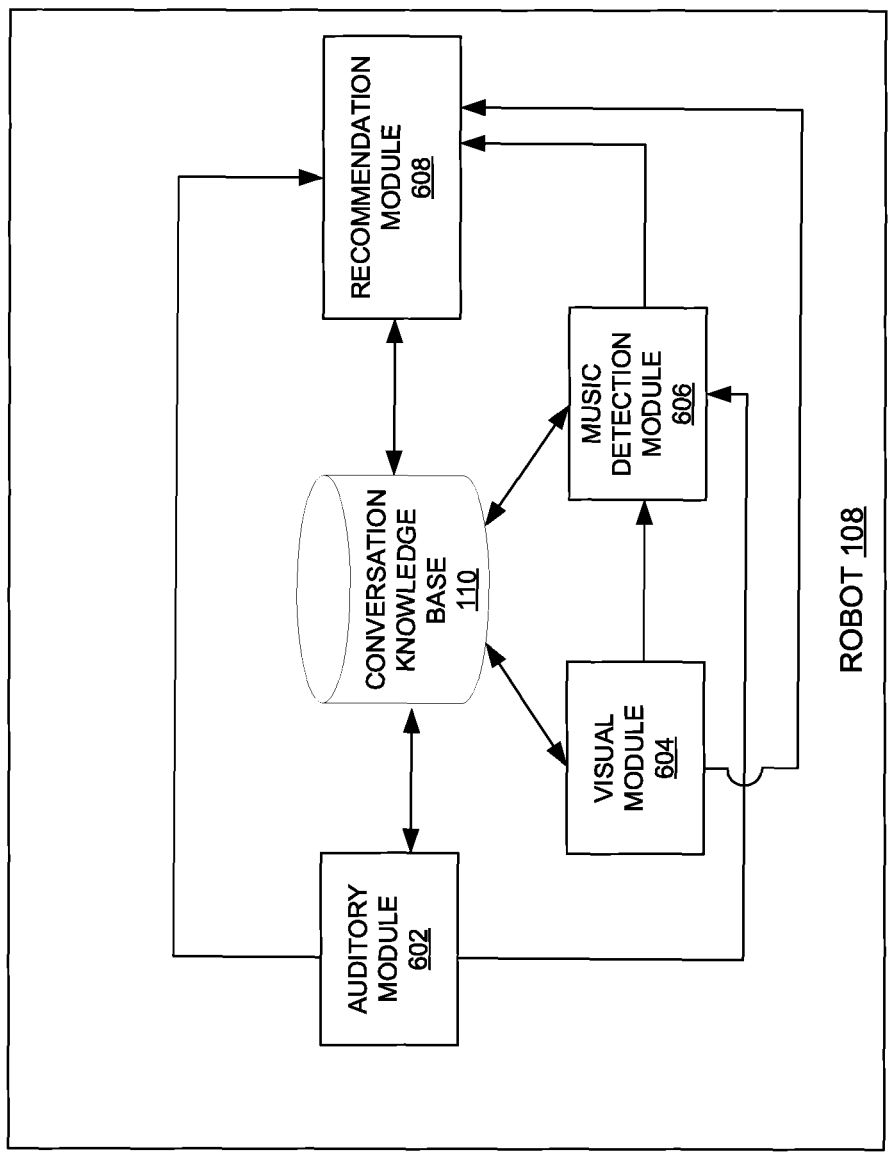
FIG. 6 is a block diagram that illustrates a robot of FIG. 1 for initiating a personalized conversation with the user based on audio events or visual events, according to some embodiments herein.

FIG. 6 is a block diagram that illustrates the robot 108 of FIG. 1 for initiating a personalized conversation with the user 102 based on audio events or visual events, according to some embodiments herein. The robot 108 includes the conversation knowledge base 110 that store conversation topics related to on audio visual events, an auditory module 602, a visual module 604, a music detection module 606 and a recommendation module 608. The auditory module 602 and visual module 604 record and classify audio events and visual events using auditory sensors and audio-visual sensor. The robot 108 may be equipped with modules to classify if the user 102 is singing and to identify the song being sung by the user 102. The robot 108 may then play the song on a speaker system for the user 102 to sing or dance along. The music detection module 606 may identify and classify the songs based on artists, albums, genre and so on.

The recommendation module 608 may determine the user's 102 favorite music genre, artist or album and suggest music recommendation based on the same. The robot 108 interacts with the user 102 based on the user 102 information received from the auditory module 602, the visual module 604, the music detection module 606 and the recommendation module 608. In the event when no music is played, the robot 108 may initiate a conversation with the user 102 to play music of user preference. In an example, the robot 108 may suggest music based on user's 102 favorite song, artist, songs belonging to a same and similar album, songs from the same genre, new songs of preferred artist and or genre. The auditory module 602 detects the user 102 based on any speaking audio voice of the user 102 by using audio localization and locomotion capabilities. The robot 108 may turn in the direction of the user 102 and initiate a conversation with the user 102. Further, in the auditory module 602, the audio is detected and recorded in a security mode. The security mode performs audio activity detection. On detection of audio activity, a security alert regarding the detection of audio activity of others will be sent to the user 102. In an embodiment, the security alert may be sent via a wireless or wired internet connection or any other telecommunication medium.

The auditory module 602, may also detect the user 102 playing a musical instrument, upon which the robot 108 may play supportive music using generative deep neural network technologies. The visual module 604 detects and records the user 102 behavior and activity. In an example the visual module 604 may identify the user 102 performing workout at home and the robot 108 initiates a conversation based on fitness, the robot 108 may also suggest and play workout music during the workout routine of the user 102. In another example, the visual module 604 identifies that the user 102 is dancing and the robot 108 initiates a conversation to dance and play music. The visual module 604 may identify if the user 102 is entering or leaving the house and initiate a conversation corresponding to user entry or exit event. The visual module 604 may perform video anomaly detection if any video anomaly is detected, then the robot 108 initiates a conversation with the user 102 via the internet or other telecommunication medium to raise an alert. The robot 108 may be equipped with a video or image categorization module to identify devices and equipment in the user's home such as television (TV), music player, fan, air conditioner (AC) and initiate a conversation with the user 102 based on the information received from the video or image categorization module.

Figure 7:
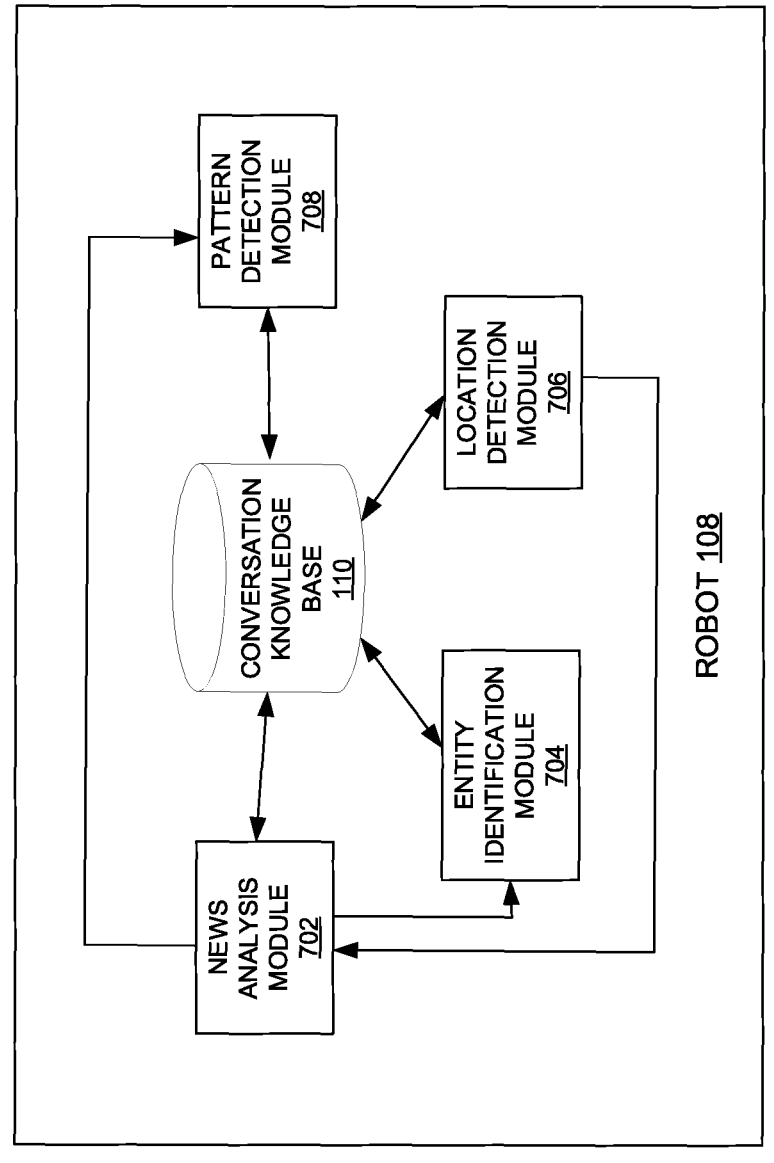
FIG. 7 is a block diagram that illustrates the robot of FIG. 1 for initiating a personalized conversation with the user based on news, according to some embodiments herein.

FIG. 7 is a block diagram that illustrates the robot 108 of FIG. 1 for initiating a personalized conversation with the user 102 based on news, according to some embodiments herein. The robot 108 includes the conversation knowledge base 110 that includes one or more conversation topics related to news events, a news analysis module 702, an entity identification module 704, a location detection module 706 and a pattern detection module 708. The news analysis module 702 is equipped to fetch and record news from various news sources of interest to the user 110. The entity identification module 704 identifies the key entities from news headlines and the robot 108 initiates a conversation with the user 102 on key entities in the news headline. The entity identification module 704 further identifies the entities and class of entities from the news headlines and news content. In an example, if Mumbai is an entity, city will be the entity class. The robot 108 monitors the entities and entity class of the user's 102 preference and initiates a conversation with the user 102. The location detection module 706 detects the location of the user for the robot 108 to initiate conversation based on the same. In an example, the robot 108 may initiate a conversation with the user 102 if the news contains news corresponding to the location of the residence, workspace, sports events, and so on of the user 102. The pattern detection module 708 detects patterns of daily news and events consumed by the user 102. The robot uses the information from the pattern detection module 708 to recommend the type of news to be showcased to the user 102.

Figure 8:
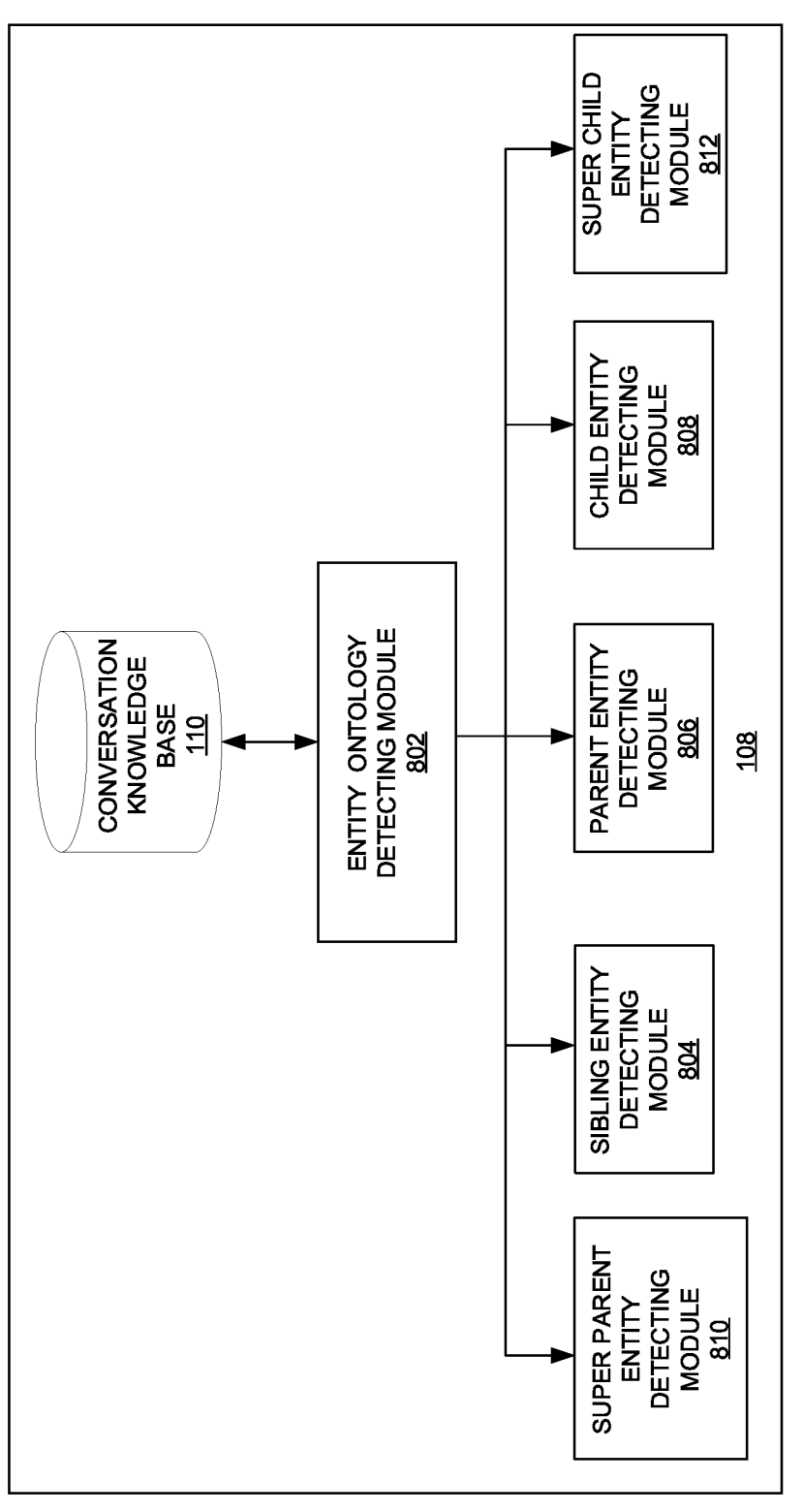
FIG. 8 is a block diagram that illustrates the robot of FIG. 1 for initiating a personalized conversation with the user based on entity ontology, according to some embodiments herein.

FIG. 8 is a block diagram that illustrates the robot 108 of FIG. 1 for initiating a personalized conversation with the user 102 based on entity ontology, according to some embodiments herein. The robot 108 includes the conversation knowledge base 110 and an entity ontology detecting module 802. The entity ontology detecting module 802 is divided into a sibling entity detecting module 804, a parent entity detecting module 806, a child entity detecting module 808, a super parent entity detecting module 810, and a super a child entity detecting module 812. The entity ontology detecting module 802 is a hierarchical representation of entities where entities comprise the sibling entity, the sibling entity class, the child entity, the child entity class, the parent entity, the parent entity class, the super parent entity, the super parent entity class, the super child entity and the super child entity class. The robot 108, using the entity ontology detecting module 802, (i) identifies at least one of entity or entity class in at least one of the detected environmental parameters, the environment event, the period of the environment event, the environment alert, the time of the event related to the user 102, the personal events related to the user 102, the personal events related to user's relatives or friends or acquaintances, the outdoor environment location, the apparel of the user 102, the audio events surrounding the user environment, the visual events surrounding the user environment, or the news, (ii) determines a conversation topic related to the identified entity or entity class or other entity or entity instance or other entity class than the identified entity or entity class from the conversation knowledge base 110 utilizing a conversational personalization engine, and (iii) initiates the personalized conversation with the user 102 based on the determined conversation topic.

The entity ontology detecting module 802 identifies at least one entity or entity class in a human robot interaction (HRI) during the personalized conversation. The sibling entity detecting module 804 detects a sibling entity or a sibling entity class based on the identified entity or entity class in the HRI. The parent entity detecting module 806 detects a parent entity, or a parent entity class based on the identified entity or entity class in the HRI. The child entity detecting module 808 detects a child entity, or a child entity class based on the identified entity or entity class in the HRI. The super parent entity detecting module 810 detects a super parent entity, or a super parent entity class belonging to the parent entity or the parent entity class. The super child entity detecting module 812 detects a super child entity, or a super child entity class belonging to the child entity, or the child entity class. The entity ontology detecting module 802 identifies properties of the entity, or properties of the entity class. The robot 108 determines at least one conversation topic, in the conversation knowledge base 110 utilizing the conversational personalization engine, related to the at least one of sibling entity class, sibling entity, child entity, child entity class, parent entity, parent entity class, super parent entity, super parent entity class, super child entity, super child entity class, properties of the entity, or properties of the entity class based on one or more parameters of user interest and initiates, using a conversation module, the personalized conversation with the user 102 based on the determined conversation topic.

In one exemplary embodiment, let consider the entity is a place. Then, in the entity ontology in the conversation knowledge base 110, place is the super parent entity, continent is the parent entity, country is the super child entity and state is the child entity and the city may be sibling entity. For instance, if the robot 108 initiates conversations, the robot 108 may initiate conversation based on a current entity class it had made the conversation with the user 102.

For example, if a current sibling entity was Mumbai, the later conversations may be based on other sibling entities like Delhi, Chennai etc. based on other parameters of interest with respect to the user 102.

Similarly, if the current conversation with the user 102 belongs to the superchild entity, wherein the superchild entity is Country then the subsequent conversations which are initiated by the robot 108 may belong to the same superchild class also taking into consideration the personal preferences of the user 102.

In one embodiment, the robot 108 interacts with the user 102 based on the user's 102 routine to listening to music, the system 100 determines the entity class of the current conversation and then interacts with the user 102 taking into consideration the specific entity class of the previous conversation along with other personal references of the user 102.

In one embodiment, the robot 108 interacts with the user 102 based on the environmental parameters around the user 102 and the entity class of the current conversation and then interacts with the user 102 taking into consideration the specific entity class of the previous conversation along with other personal references of the user 102.

FIGS. 9A and 9B are flow diagrams that illustrate a method for a robot-initiated personalized conversation with a user 102, based on surrounding and proclivity of a user, according to some embodiments herein. The robot 108 initiates a personalized conversation with the user 102 based on the surrounding and proclivity of the user 102. At step 902, at least one of environmental parameters, to determine an environment event, a period of the environment event, an environment alert, and an anomaly environment event by processing the detected environmental parameters, a time of an event related to the user 102, personal events related to the user 102, personal events related to user's relatives or friends or acquaintances, an outdoor environment location, an apparel of the user 102, audio events, visual events, or news, are detected using one or more sensor units 111 in the surrounding and proclivity of the user 102. At step 904, at least one conversation topic in a conversation knowledge base 110 is determined by the robot 108 utilizing a conversational personalization engine that is related to detected environmental parameters, the environment event, the period of the environment event, the environment alert, the time of the event related to the user 102, the personal events related to the user 102, the personal events related to user's relatives or friends or acquaintances, the outdoor environment location, the apparel of the user 102, the audio events, the visual events, or the news. At step 906, conversed or interacted with the user 102 by the robot 108 using an output unit by converting the at least one conversation topic into at least one output action and performing the at least one output action to converse or interact with the user 102. At step 908, an entity or entity class in a human robot interaction (HRI), during the personalized conversation, is identified by the robot 108 by processing a conversation content during personalized conversation that is uttered by the robot 108 or the user 102 and identifying the entity or entity class in the conversation content, the entity being a piece of word in the. At step 910, conversed or interacted with the user 102 by the robot 108 using the output unit by converting the at least one conversation topic related to the entity or entity class into at least one output action and performing the at least one output action to converse or interact with the user 102.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
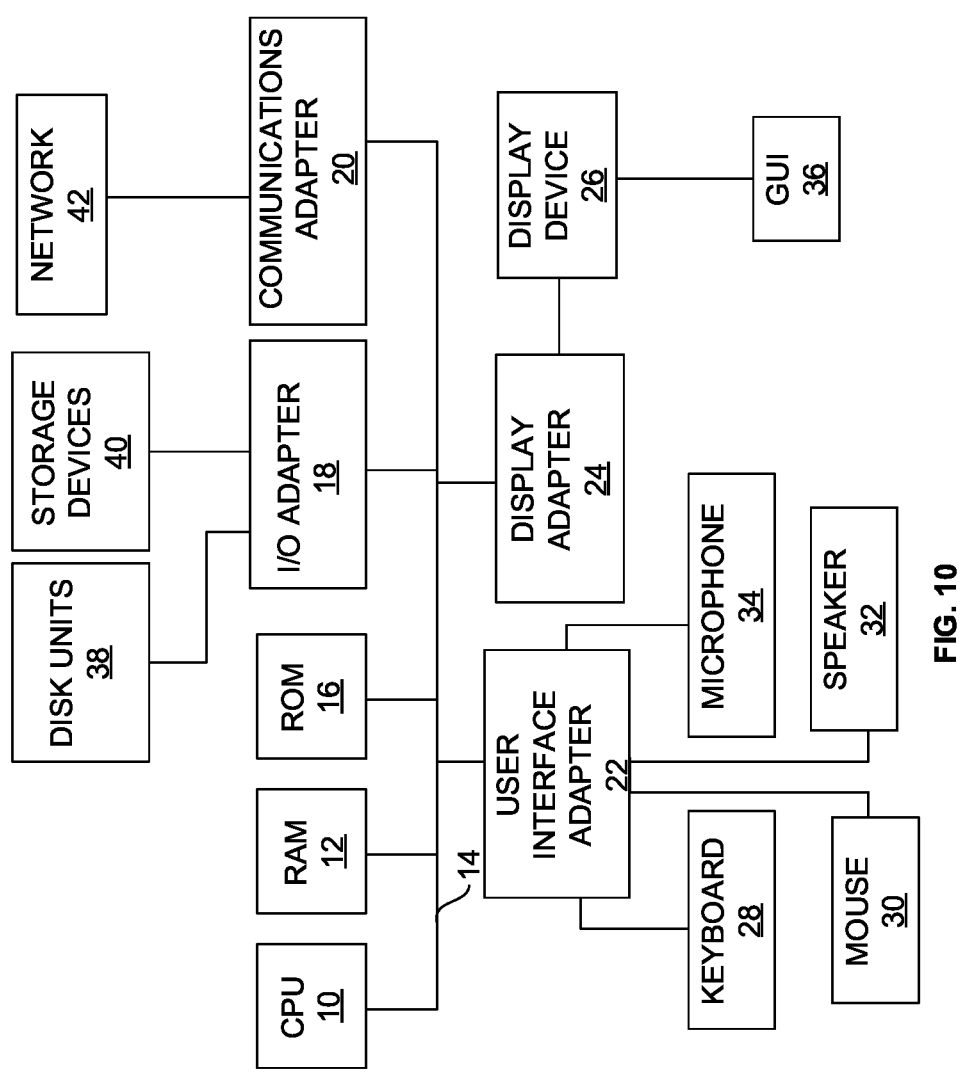
FIG. 10 is a schematic diagram of a computer architecture for personalized user and robot interaction, in accordance with the embodiments herein.

A representative hardware environment for practicing the embodiments herein is depicted in FIG. 10 with reference to FIGS. 1 through 9. This schematic drawing illustrates a hardware configuration of the robot 108/computer system/ computing device in accordance with the embodiments herein. The system includes at least one processing device CPU 10 that may be interconnected via system bus 15 to various devices such as a random access memory (RAM) 12, read-only memory (ROM) 16, and an input/output (I/O) adapter 18. The I/O adapter 18 can connect to peripheral devices, such as disk units 58 and program storage devices 50 that are readable by the system. The system can read the inventive instructions on the program storage devices 50 and follow these instructions to execute the methodology of the embodiments herein. The system further includes a user interface adapter 22 that connects a keyboard 28, mouse 50, speaker 52, microphone 55, and/or other user interface devices such as a touch screen device (not shown) to the bus 15 to gather user input. Additionally, a communication adapter 20 connects the bus 15 to a data processing network 52, and a display adapter 25 connects the bus 15 to a display device 26, which provides a graphical user interface (GUI) 56 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor implemented method for a robot initiated personalized conversation with a user, based on surrounding and proclivity of the user, wherein the robot initiates the personalized conversation with the user based on the surrounding and proclivity of the user that comprises the a processor; and a memory that stores a conversation knowledge base that comprises one or more conversation topic ontologies, and a set of instructions capable of being executed by the processor, wherein the method comprising:

detecting, using one or more sensor units of the robot, at least one of environmental parameters thereafter to determine an environment event, a period of the environment event, and an anomaly environment event by processing the detected environmental parameters, an environment alert, a time of an event related to the user, personal events related to the user, personal events related to user's relatives or friends or acquaintances, an outdoor environment location, an apparel of the user, audio events, visual events, or news, in the surrounding and proclivity of the user;

determining, by the robot, at least one conversation topic in a conversation knowledge base utilizing a conversational personalization engine that is related to detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news;

conversing or interacting, using an output unit of the robot, with the user by converting the at least one conversation topic into at least one output action and performing the at least one output action to converse or interact with the user;

identifying, by the robot, at least one entity or entity class in a human robot interaction (HRI) during the personalized conversation by processing a conversation content during the personalized conversation that is uttered by the robot or the user and identifying the at least one entity or entity class in the conversation content, the at least one entity being a piece of word in the conversation;

identifying, by the robot, at least one of a sibling entity, a sibling entity class, a child entity, a child entity class, a parent entity, or a parent entity class corresponding to the at least one entity or entity class that is identified in the personalized conversation using an entity ontology in the conversation knowledge base;

identifying, by the robot, at least one of a super-parent entity belonging to the parent entity, a super-parent entity class belonging to the parent entity class, a super-child entity belonging to the child entity, a super-child entity class belonging to the child entity class, wherein the entity ontology is a hierarchical representation of the entities comprising the sibling entity, the sibling entity class, the child entity, the child entity class, the parent entity, the parent entity class, the super-parent entity, the super-parent entity class, the super-child entity, and the super-child entity class;

determining, by the robot, at least one conversation topic in the conversation knowledge base utilizing the conversational personalization engine, the conversation topic being related to the sibling entity, sibling entity class, child entity, child entity class, parent entity, parent entity class, super-parent entity, super-parent entity class, super-child entity, or super-child entity class based on one or more parameters of user interest; and conversing or interacting, using the output unit of the robot, with the user by converting the at least one conversation topic into at least one output action and performing the at least one output action to converse or interact with the user.

2. The processor implemented method as claimed in claim 1, wherein the method comprises initiating the personalized conversation, by the robot based on an environment by:

detecting, using the one or more sensor units, the environment parameters in the surrounding of the user or a place of interest to the user, wherein the robot uses at least one of a weather tracking unit, an environment tracking service, a global positioning system (GPS) unit, an audio sensor or a visual sensor to detect the environment parameters;

determining the environment event in the surrounding of the user or the place of interest to the user based on the detected environment parameters;

determining a period of the environmental event by matching a pattern of the environmental event with a historical pattern of the environmental event;

determining whether the environment event occurs for a first time or occurs abnormally by performing anomaly event detection on the detected environment parameters;

determining a conversation topic related to at least one of the environment parameters, the environment event, the period of the environmental event or a first occurrence or an abnormal occurrence of the environment event, from the conversation knowledge base utilizing the conversational personalization engine; and conversing or interacting, using the output unit of the robot, with the user by initiating the personalized conversation based on the determined conversation topic.

3. The processor implemented method as claimed in claim 1, wherein the method comprises initiating the personalized conversation, by the robot based on the environment alert by:

determining at least one environment alert related to the surrounding of the user or a place of interest to the user from an environment weather service, wherein the environment alert comprises at least one of fog, cyclones, storms, tsunami, flood, earthquakes, landslides, volcanic activity, extreme temperatures, drought or wildfires;

determining a conversation topic related to the at least one environment alert from the conversation knowledge base utilizing the conversational personalization engine; and conversing or interacting, using the output unit of the robot, with the user by initiating the personalized conversation with the user based on the determined conversation topic.

4. The processor implemented method as claimed in claim 1, wherein the method comprises initiating the personalized conversation, by the robot based on an event and time by:

tracking and identifying the user in a day, wherein the robot uses a global positioning system (GPS) unit or an identification unit to track and identify the user;

detecting at least one of a time of the day, the personal events related to the user on the day or in upcoming days, the personal events related to user's relatives or friends or acquaintances on the day in the upcoming days, or key milestones in the personal events, wherein the personal events comprise at least one of birthdays, wedding, anniversaries, family events, holidays, festivals, scheduled meetings or events or preference of the user;

determining a conversation topic related to at least one of the time of the day, the personal events related to the user on the day or in the upcoming days, the personal events related to user's relatives or friends or acquaintances on the day or in the upcoming days, or key milestones in the personal events, from the conversation knowledge base utilizing the conversational personalization engine; and conversing or interacting, using the output unit of the robot, with the user by initiating the personalized conversation with the user based on the determined conversation topic.

5. The processor implemented method as claimed in claim 1, wherein the method comprises initiating the personalized conversation, by the robot, based on the outdoor environment location by:

identifying the outdoor environment location of the user;

detecting at least one of an entity, a parameter, a property or a monument associated with the outdoor environment location;

determining a conversation topic related to at least one of the entity, the parameter, the property or the monument associated with the outdoor environment location, from the conversation knowledge base utilizing the conversational personalization engine; and conversing or interacting, using the output unit of the robot, with the user by initiating the personalized conversation with the user based on the determined conversation topic.

6. The processor implemented method as claimed in claim 1, wherein the method comprises initiating the personalized conversation, by the robot based on the apparel of the user by:

tracking an apparel of the user in a home environment of the user daily;

identifying features and properties of daily apparels of the user based on the tracked apparels;

detecting at least one of a favorite apparel, a favorite color, a favorite apparel type, properties of the favorite apparel, a new apparel, an apparel preference of the user or a pattern of usage of the apparels based on the tracked apparels and the properties of daily apparels;

determining a conversation topic related to at least one of the favorite apparel, the favorite color, the favorite apparel type, the properties of the favorite apparel, the new apparel, the apparel preference of the user, or the pattern of usage of the apparels; and conversing or interacting, using the output unit of the robot, with the user by initiating the personalized conversation with the user based on the determined conversation topic.

7. The processor implemented method as claimed in claim 6, wherein the method comprises monitoring shopping habits of the user by accessing purchase and online ecommerce browsing history of the user; and providing a plurality of personalized recommendation of apparels based on at least one of features and properties of daily apparels, features and properties of the favorite apparel, the apparel preference or the pattern of usage of the apparels, or shopping habits of the user.

8. The processor implemented method as claimed in claim 1, wherein the method comprises tracking at least one of popular personalities, people and handles or links followed by the user;

identifying if the anyone else in a social media network of user or handles followed by the user has worn an apparel that is similar to the apparel of the user or has worn an apparel that comprises same type, color, combination as similar to the apparel of the user; and conversing or interacting, using the output unit of the robot, with the user by initiating a conversation with the user to provide an information that someone else in the social media network of user or handles followed by the user has worn the apparel that is similar to the apparel of the user or has worn the apparel that comprises same type, color, combination as similar to the apparel of the user.

9. The processor implemented method as claimed in claim 1, wherein the method comprises initiating the personalized conversation, by the robot, based on the news by:

fetching news from a news source of interest of the user;

identifying at least one of key entities or entity class in news headlines or news content of the news;

determining a conversation topic related to at least one of identified key entities or entity class in the news headlines or the news content; and conversing or interacting, using the output unit of the robot, with the user by initiating the personalized conversation with the user based on the determined conversation topic.

10. The processor implemented method as claimed in claim 1, wherein the method comprises initiating the personalized conversation, by the robot, based on the audio events or the visual events by:

classifying at least one audio event or at least one visual event related to the user; and conversing or interacting, using the output unit of the robot, with the user by initiating an interaction with the user based on the classified at least one audio event or video event.

11. The processor implemented method as claimed in claim 1, wherein method comprises identifying at least one of entity or entity class in at least one of the detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news;

determining a conversation topic related to the identified entity or entity class or other entity or entity instance or other entity class than the identified entity or entity class, from the conversation knowledge base utilizing the conversational personalization engine; and conversing or interacting, using the output unit of the robot, with the user by initiating the personalized conversation with the user based on the determined conversation topic.

12. The processor implemented method as claimed in claim 1, wherein the method comprises identifying at least one of a sibling entity, a sibling entity class, a child entity, a child entity class, a parent entity, a parent entity class, a super parent entity, a super parent entity class, a super child entity, a super child entity class, properties of the entity, or properties of the entity class, based on the identified entity or entity class using an entity ontology, wherein the conversation knowledge base comprises the entity ontology which is a hierarchy representation of entities;

determining a conversation topic, in the conversation knowledge base utilizing the conversational personalization engine, related to the at least one of sibling entity, sibling entity class, child entity, child entity class, parent entity, parent entity class, super parent entity, super parent entity class, super child entity, super child entity class, properties of the entity, or properties of the entity class based on one or more parameters of user interest; and conversing or interacting, using the output unit of the robot, with the user by initiating the personalized conversation with the user based on the determined conversation topic.

13. A system for a robot initiated personalized conversation with a user, based on surrounding and proclivity of the user, the system comprising:

a robot that initiates a personalized conversation with a user based on the surrounding and proclivity of the user, wherein the robot comprises a processor; and a memory that stores a conversation knowledge base that comprises one or more conversation topic ontologies, and a set of instructions capable of being executed by the processor to detect, using one or more sensor units, at least one of environmental parameters thereafter to determine an environment event, a period of the environment event and an anomaly environment event by processing the detected environmental parameters, an environment alert, a time of an event related to the user, personal events related to the user, personal events related to user's relatives or friends or acquaintances, an outdoor environment location, an apparel of the user, audio events, visual events, or news, in the surrounding and proclivity of the user, determine at least one conversation topic in the conversation knowledge base utilizing a conversational personalization engine that is related to detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news;

converse or interact, using an output unit of the robot, with the user by converting the at least one conversation topic into at least one output action and performing the at least one output action to converse or interact with the user;

identify at least one entity or entity class in a human robot interaction (HRI) during the personalized conversation by processing a conversation content during the personalized conversation that is uttered by the robot or the user and identifying the at least one entity or entity class in the conversation content, the at least one entity being a piece of word in the conversation content;

identify at least one of a sibling entity, a sibling entity class, a child entity, a child entity class, a parent entity, or a parent entity class corresponding to the at least one entity that is identified in the personalized conversation using an entity ontology in the conversation knowledge base;

identify at least one of a super-parent entity belonging to the parent entity, a super-parent entity class belonging to the parent entity class, a super-child entity belonging to the child entity, a super-child entity class belonging to the child entity class, wherein the entity ontology is a hierarchy representation of the entity where entities comprises the sibling entity, the sibling entity class, the child entity, the child entity class, the parent entity, the parent entity class, the super parent entity, the super parent entity class, the super child entity and the super child entity class;

determine at least one conversation topic, in the conversation knowledge base utilizing the conversational personalization engine, related to the at least one of sibling entity, sibling entity class, child entity, child entity class, parent entity, parent entity class, super parent entity, super parent entity class, super child entity, or super child entity class based on one or more parameters of user interest; and converse or interact, using the output unit of the robot, with the user by converting the at least one conversation topic related to the at least one entity or entity class that is identified into at least one output action and performing the at least one output action to converse or interact with the user.

14. The system as claimed in claim 13, wherein the processor is configured to identify at least one of entity or entity class in at least one of the detected environmental parameters, the environment event, the period of the environment event, the environment alert, the time of the event related to the user, the personal events related to the user, the personal events related to user's relatives or friends or acquaintances, the outdoor environment location, the apparel of the user, the audio events, the visual events, or the news;

determine a conversation topic related to the identified entity or entity class or other entity or entity instance or entity class than the identified entity or entity class, from the conversation knowledge base utilizing the conversational personalization engine; and converse or interact, using the output unit of the robot, with the user by initiating the personalized conversation with the user based on the determined conversation topic.

15. The system as claimed in claim 13, wherein the processor is configured to identify at least one of a sibling entity, a sibling entity class, a child entity, a child entity class, a parent entity, a parent entity class, a super parent entity, a super parent entity class, a super child entity, a super child entity class, a properties of the entity, or a properties of the entity class, corresponding to the identified entity or entity class in an entity ontology, wherein the conversation knowledge base comprises the entity ontology tree which is a hierarchy representation of entities;

determine a conversation topic, in the conversation knowledge base utilizing the conversational personalization engine, related to the at least one of sibling entity, sibling entity class, child entity, child entity class, parent entity, parent entity class, super parent entity, super parent entity class, super child entity, super child entity class, properties of the entity, or properties of the entity class based on one or more parameters of user interest; and converse or interact, using the output unit of the robot, with the user by initiating the personalized conversation with the user based on the determined conversation topic.

* * * * *